(12) United States Patent
Aoyagi et al.

(10) Patent No.: US 9,586,383 B2
(45) Date of Patent: Mar. 7, 2017

(54) RUBBER LAMINATED RESIN COMPOSITE

(71) Applicant: NOK CORPORATION, Tokyo (JP)

(72) Inventors: Yuichi Aoyagi, Kanagawa (JP); Kiyofumi Fukasawa, Kanagawa (JP)

(73) Assignee: NOK Corporation, Tokyo (JP)

( * ) Notice: Subject to any disclaimer, the term of this patent is extended or adjusted under 35 U.S.C. 154(b) by 197 days.

(21) Appl. No.: 14/378,620

(22) PCT Filed: Feb. 25, 2013

(86) PCT No.: PCT/JP2013/054714
§ 371 (c)(1),
(2) Date: Aug. 13, 2014

(87) PCT Pub. No.: WO2013/129293
PCT Pub. Date: Sep. 6, 2013

(65) Prior Publication Data
US 2015/0017453 A1    Jan. 15, 2015

(30) Foreign Application Priority Data

Feb. 29, 2012 (JP) .................................. 2012-042818

(51) Int. Cl.
| | | |
|---|---|---|
| B32B 25/08 | (2006.01) |
| B32B 38/00 | (2006.01) |
| B32B 7/10 | (2006.01) |
| B32B 27/34 | (2006.01) |
| C08J 5/12 | (2006.01) |
| C09J 5/06 | (2006.01) |
| B32B 7/12 | (2006.01) |
| B32B 27/20 | (2006.01) |
| B29C 65/02 | (2006.01) |
| B29C 65/00 | (2006.01) |
| B29K 77/00 | (2006.01) |
| B29K 105/16 | (2006.01) |
| B29K 507/04 | (2006.01) |
| B29K 509/08 | (2006.01) |

(52) U.S. Cl.
CPC .............. *B32B 25/08* (2013.01); *B29C 65/00* (2013.01); *B32B 7/10* (2013.01); *B32B 7/12* (2013.01); *B32B 27/20* (2013.01); *B32B 27/34* (2013.01); *B32B 38/0036* (2013.01); *C08J 5/121* (2013.01); *C09J 5/06* (2013.01); *B29C 65/02* (2013.01); *B29C 66/41* (2013.01); *B29C 66/71* (2013.01); *B29C 66/712* (2013.01); *B29C 66/7212* (2013.01); *B29C 66/72141* (2013.01); *B29C 66/72143* (2013.01); *B29C 66/73751* (2013.01); *B29K 2077/00* (2013.01); *B29K 2105/16* (2013.01); *B29K 2507/04* (2013.01); *B29K 2509/08* (2013.01); *B32B 2038/0076* (2013.01); *B32B 2262/101* (2013.01); *B32B 2262/106* (2013.01); *B32B 2270/00* (2013.01); *B32B 2355/00* (2013.01); *B32B 2377/00* (2013.01); *C08J 2321/00* (2013.01); *C08J 2377/00* (2013.01); *C09J 2421/006* (2013.01); *C09J 2477/006* (2013.01); *Y10T 428/31725* (2015.04); *Y10T 428/31757* (2015.04)

(58) Field of Classification Search
None
See application file for complete search history.

(56) References Cited

U.S. PATENT DOCUMENTS 6,074,719 A * 6/2000 Fukushi ................. B32B 27/08
138/141

FOREIGN PATENT DOCUMENTS

| JP | 9-239905 | | 9/1997 |
| JP | 2005-67189 | A | 3/2005 |
| JP | 2006-89565 | A | 4/2006 |
| JP | 2007-270877 | A | 10/2007 |
| WO | WO 2010/047315 | A1 | 4/2010 |

OTHER PUBLICATIONS

International Search Report from corresponding PCT application No. PCT/JP2013/054714 dated May 21, 2013 (4 pgs).
International Preliminary Report on Patentability and Written Opinion from corresponding PCT application No. PCT/JP2013/054714 dated Sep. 2, 2014 (5pgs).

* cited by examiner

*Primary Examiner* — Ana Woodward
(74) *Attorney, Agent, or Firm* — Brinks Gilson & Lione

(57) ABSTRACT

Provided is a rubber laminated resin composite comprising a polyamide-based resin molded product and rubber that is vulcanization bonded to the polyamide-based resin molded product; the polyamide-based resin molded product being molded from a polyamide-based resin that is blended with 0 to 70 wt. % of a filler based on the total amount of the filler and the polyamide-based resin, and that comprises an aliphatic amine compound having an amine equivalent of 950 or less in an amount of 0.045 mmol or more, preferably 0.050 to 2.0 mmol, more preferably 0.065 to 1.5 mmol, per g of the polyamide-based resin. The rubber laminated resin composite is produced by molding a polyamide-based resin that is blended or not blended with a filler, after the addition of an aliphatic amine compound thereto, and then vulcanization bonding of fluororubber or acrylic rubber to the obtained polyamide-based resin molded product.

8 Claims, No Drawings ing point: 306° C.), and the like; or an alloy or blend of these resins. Any polyamide-based resin can be used.
RUBBER LAMINATED RESIN COMPOSITE

RELATED APPLICATION

This application is a 35 U.S.C. §371 national phase filing of International Patent Application No. PCT/JP2013/054714, filed Feb. 25, 2013, through which and to which priority is claimed under 35 U.S.C. §119 to Japanese Patent Application No. 2012-042818, filed Feb. 29, 2012.

TECHNICAL FIELD

The present invention relates to a rubber laminated resin composite. More particularly, the present invention relates to a rubber laminated resin composite obtained by vulcanization bonding of rubber and a polyamide-based resin molded product without using an adhesive.

BACKGROUND ART

To form a unified composite of a polyimide-based resin molded product and acrylic rubber or fluororubber, there is a known method for vulcanization bonding of the resin molded product and the rubber using an adhesive. However, the method using an adhesive has complicated process and thus requires intricate process control, thereby causing high production costs. There is another problem that sufficient adhesion cannot always be obtained.

To address these problems, for example, Patent Document 1 proposes a method for bonding a resin to rubber, the method comprising treating the surface of the resin so that the average surface roughness is 0.1 or more, applying an adhesive to the treated surface, and vulcanization bonding of the rubber to the surface. However, this method requires, in addition to the process of using an adhesive, another process of treating the resin surface.

PRIOR ART DOCUMENT

Patent Document

Patent Document 1: JP-A-2006-89565

OUTLINE OF THE INVENTION

Problem to be Solved by the Invention

An object of the present invention is to provide a rubber laminated resin composite obtained by bonding, without using an adhesive, a polyamide-based resin molded product and rubber, such as acrylic rubber or fluororubber, with sufficient adhesive strength by a simple process.

Means for Solving the Problem

The above object of the present invention can be achieved by a rubber laminated resin composite comprising a polyamide-based resin molded product and rubber that is vulcanization bonded to the polyamide-based resin molded product; the polyamide-based resin molded product being molded from a polyamide-based resin that is blended with 0 to 70 wt. % of a filler based on the total amount of the filler and the polyamide-based resin, and that comprises an aliphatic amine compound having an amine equivalent of 950 or less in an amount of 0.045 mmol or more, preferably 0.050 to 2.0 mmol, more preferably 0.065 to 1.5 mmol, per g of the polyamide-based resin.

Effect of the Invention

The rubber laminated resin composite of the present invention has such an excellent effect that sufficient adhesion between rubber and a polyamine-based resin molded product is achieved, without using an adhesive, only by vulcanization bonding of the rubber to the polyamine-based resin molded product, because an aliphatic amine compound having an amine equivalent of 950 or less is added to the polyamide-based resin, which is blended with 0 to 70 wt. %, preferably 0 to 50 wt. %, of a filler based on the total amount of the filler and the polyamide-based resin, in an amount of 0.045 mmol or more per g of the polyamide-based resin.

EMBODIMENTS FOR CARRYING OUT THE INVENTION

The polyamide-based resin to be used is at least one member selected from polyamide 66 (melting point: 260° C.), polyamide 6 (melting point: 220° C.), polyamide 610 (melting point: 215° C.), polyamide 612 (melting point: 220° C.), polyamide 11 (melting point: 187° C.), polyamide 12 (melting point: 176° C.), polyamide 46 (melting point: 290° C.), polyamide 6T/6I (melting point: 310° C.), polyamide 6T/66 (melting point: 260 to 340° C.), polyamide 6T/6 (melting point: 230 to 340° C.), polyamide 9T (melting point: 306° C.), and the like; or an alloy or blend of these resins. Any polyamide-based resin can be used.

Moreover, in order to ensure the resin physical properties, including strength and processability, the polyamide-based resin is blended with a filler, such as glass fibers, carbon fibers, aramid fibers, or metal fibers; preferably glass fibers or carbon fibers. The amount of the filler is 70 wt. % or less, preferably 15 to 50 wt. %, based on the total amount of the filler and the polyamide-based resin.

Glass fibers generally used are, for example, chopped strands having a diameter of about 1 to 50 μm, preferably about 5 to 20 μm, and a length of about 1 to 50 mm, preferably about 1 to 10 mm; and milled fibers obtained by milling strands into a fine powder. Such glass fibers may be surface-treated with a bundling agent that is a polymer emulsion or a silane coupling agent. Moreover, a unidirectional composite material made of glass fibers, such as E glass or T glass, and epoxy resin, vinyl ester, or the like, can also be used. Carbon fibers generally used are PAN-based carbon fibers having a diameter of about 1 to 50 μm and a length of about 1 to 50 mm. In addition, pitch-based carbon fibers can also be used.

The polyamide-based resin is mixed with an aliphatic amine compound. Usable aliphatic amine compounds are those having an amine equivalent of 950 or less, preferably 250 or less. When an aliphatic amine compound having an amine equivalent of greater than this range is used, reactivity is low, so that no improvement in adhesion is expected. When an aromatic amine compound is used, even when the amine equivalent thereof is within the specified range, no improvement in adhesion is achieved, as shown in Comparative Examples 4 and 5, described later.

When the boiling point of an amine compound is overly lower than that of the polyamide-based resin, the amine compound is volatilized when it is added to the polyamide. Hence, an amine compound suitable for the addition to, for example, polyamide 66, which has a melting point of 260°

C., is one having a boiling point of 120° C. or more, preferably 150° C. or more, although it depends on the type of polyamide used.

The amount of such an aliphatic amine compound is used 0.045 mmol or more, preferably 0.050 to 2.0 mmol, more preferably 0.065 to 1.5 mmol, per g of the polyamide-based resin that is blended with 0 to 70 wt. % of a filler based on the total amount of the filler and the polyamide-based resin. When the amount of aliphatic amine compound is less than this range, no improvement in adhesion is achieved. Examples of aliphatic amine compounds include polyamine compounds, such as tetraethylenepentamine (boiling point: 330° C.), norbornanediamine (boiling point: 226° C.), hexamethylenediamine dicarbamate (boiling point: 325.3° C.), α,ω-diaminododecane (boiling point: 304° C.), and polyetheramine having an amine equivalent of 50 to 950 (boiling point: 260° C. or more). The polyetheramine as mentioned herein is a reaction product of a polyether alcohol, and ammonia, an aliphatic amine, or an alicyclic amine.

The polyamide-based resin and the aliphatic amine compound are kneaded, together with a filler, when used, by melting and mixing them at 190 to 330° C. using a twin-screw extruder, a single-screw extruder, or the like. Then, the polyamide-based resin is molded by an injection molding machine, an extruder, a blow molding machine, a vacuum molding machine, or the like.

To the resulting polyamide-based resin molded product, a rubber compound, such as a fluororubber compound or an acrylic rubber compound, is bonded, if necessary, in the form of an organic solvent solution of the rubber compound, followed by press vulcanization under the vulcanization conditions for the rubber compound used, for example, at about 100 to 250° C. for about 1 to 120 minutes, thereby obtaining a rubber laminated resin composite in which the polyamide resin and a rubber layer having a thickness of about 0.01 to 10 mm are bonded to each other with sufficient strength.

Examples of fluororubber compounds include polyol-vulcanizable or peroxide-crosslinkable fluororubber compounds. Polyol-vulcanizable fluororubber compounds are obtained by blending various compounding agents into fluororubber vulcanized with a polyol vulcanizing agent. Peroxide-crosslinkable fluororubber compounds are obtained by blending various compounding agents into fluororubber, generally fluororubber into which an iodine group and/or a bromine group is introduced as a terminal group. In this case, it is preferable to use, in combination with an organic peroxide crosslinking agent, a polyfunctional unsaturated compound co-crosslinking agent, typified by triallyl isocyanurate.

Acrylic rubber compounds are obtained by blending various compounding agents into acrylic rubber in which an alkyl acrylate containing an alkyl group having 1 to 8 carbon numbers and/or an alkoxyalkyl acrylate containing an alkylene group having 2 to 8 carbon numbers is copolymerized with small amounts of various vinyl monomers having a crosslinkable group, such as reactive halogen-containing vinyl monomers and carboxyl group-containing vinyl monomers; epoxy group-containing monomers, and hydroxyl group-containing monomers. In this case, various crosslinking agents can be used depending on the type of crosslinkable group.

When using an acrylic rubber copolymerized with an unsaturated group-containing vinyl monomer or an ethylene-alkyl acrylate copolymer rubber as a crosslinkable group-containing vinyl monomer, an organic peroxide is used as a crosslinking agent. In this case, it is preferable to use a polyfunctional unsaturated compound co-crosslinking agent in combination. The acrylic rubber is mixed with various compounding agents, in addition to a crosslinking agent and a co-crosslinking agent, to form an acrylic rubber compound.

EXAMPLES

The following describes the present invention with reference to Examples.

Example 1

Using a twin-screw extruder (screw diameter: Φ25 mm, L/D=41), 20 parts by weight of glass fiber (CSX-3J-451S, produced by Nitto Boseki Co., Ltd.; diameter: 11 μm, and length: 3 mm) was supplied from a side feeder, and 5 parts by weight of polyetheramine (JEFFAMINE T403, produced by Huntsman; theoretical molecular weight: 440, number of functional groups: 3, theoretical amine equivalent: 147 g/mol, and boiling point: 260° C. or more) was supplied from the said feeder vent, to 80 parts by weight of polyamide 66 (CM3006, produced by Toray Industries, Inc.; melting point: 260° C.). The mixture was melted and mixed at 270° C. to prepare a polyamide resin composition. The polyamide resin composition was formed into an amide resin molded sheet (25×60×2 mm) using an injection molder set a cylinder temperature at 280° C. and a mold temperature at 80° C. The theoretical amine equivalent was calculated by dividing the theoretical molecular weight by the theoretical number of functional groups, and the calculation was performed with a purity of 100% (the same applies hereinafter).

Subsequently, an unvulcanized fluororubber compound or an unvulcanized acrylic rubber compound (their compositions are shown below) was bonded to the amide resin molded sheet, followed by vulcanization under pressure at 180° C. for 6 minutes (for the fluororubber compound) or 8 minutes (for the acrylic rubber compound), thereby obtaining a rubber laminated resin composite having a 6-mm-thick rubber layer.

[Fluororubber Compound; Compounding Example I]

| | |
|---|---|
| Fluororubber (Viton E45, produced by DuPont) | 100 parts by weight |
| Calcium metasilicate | 40 parts by weight |
| MT carbon black | 20 parts by weight |
| Magnesium oxide (Magnesia #150, produced by Kyowa Chemical Industry Co., Ltd.) | 6 parts by weight |
| Calcium hydroxide | 3 parts by weight |
| Vulcanizing agent (Curative #30, produced by DuPont) | 2 parts by weight |
| Vulcanization accelerator (Curative #20, produced by DuPont) | 1 part by weight |

[Acrylic Rubber Compound; Compounding Example II]

| | |
|---|---|
| Acrylic rubber (PA-522HF, produced by Unimatec Co., Ltd.) | 100 parts by weight |
| HAF carbon black | 55 parts by weight |
| Stearic acid | 1 part by weight |
| Antioxidant (Naugard 445, produced by Shiraishi Calcium Kaisha, Ltd.) | 2 parts by weight |
| Processing aid (Struktol WB212, produced by Schil & Seilacher (GmbH & Co)) | 2 parts by weight |
| Processing aid (Phosphanol RL210, produced by Toho Chemical Industry Co., Ltd.) | 0.5 parts by weight |

-continued

| | |
|---|---|
| Amine vulcanizing agent (Cheminox AC-6, produced by Unimatec Co., Ltd.) | 0.6 parts by weight |
| Vulcanization accelerator (Nocceler DT, produced by Ouchi Shinko Chemical Industrial Co., Ltd.) | 2 parts by weight |

Example 2

In Example 1, the same amount of tetraethylenepentamine (theoretical molecular weight: 189.3, number of functional groups: 5, theoretical amine equivalent: 38 g/mol, and boiling point: 330° C.) was used in place of polyetheramine.

Example 3

In Example 1, the same amount of norbornanediamine (theoretical molecular weight: 154, number of functional groups: 2, theoretical amine equivalent: 77 g/mol, and boiling point: 227° C.) was used in place of polyetheramine.

Example 4

In Example 1, the same amount of hexamethylenediamine dicarbamate (theoretical molecular weight: 160, number of functional groups: 2, theoretical amine equivalent: 80 g/mol, and boiling point: 325.3° C.) was used in place of polyetheramine.

Example 5

In Example 1, the same amount of $\alpha,\omega$-diaminododecane (theoretical molecular weight: 200.37, number of functional groups: 2, theoretical amine equivalent: 100 g/mol, and boiling point: 304° C.) was used in place of polyetheramine.

Example 6

In Example 1, the same amount of JEFFAMINE D400 (produced by Huntsman; theoretical molecular weight: 400, number of functional groups: 2, theoretical amine equivalent: 200 g/mol, and boiling point: 260° C.) was used as polyetheramine.

Example 7

In Example 1, the amount of polyetheramine was changed to 10 parts by weight.

Example 8

In Example 1, the amount of polyetheramine was changed to 1 part by weight.

Example 9

In Example 1, the amount of polyetheramine was changed to 0.75 parts by weight.

Example 10

In Example 1, in which 5 parts by weight of polyetheramine was used, no glass fiber was used, and 100 parts by weight of polyamide 66 was used.

Example 11

In Example 8, in which 1 part by weight of polyetheramine was used, no glass fiber was used, and 100 parts by weight of polyamide 66 was used.

Comparative Example 1

In Example 1, polyetheramine was not used.

Comparative Example 2

In Example 1, the same amount of JEFFAMINE D2000 (produced by Huntsman; theoretical molecular weight: 2,000, number of functional groups: 2, theoretical amine equivalent: 1,000 g/mol, and boiling point: 260° C. or more) was used as polyetheramine.

Comparative Example 3

In Example 1, the same amount of JEFFAMINE T5000 (produced by Huntsman; theoretical molecular weight: 5,000, number of functional groups: 3, theoretical amine equivalent: 1,667 g/mol, and boiling point: 260° C. or more) was used in place of polyetheramine.

Comparative Example 4

In Example 1, the same amount of 4,4'-diaminodiphenylsulfone (theoretical molecular weight: 154.1, number of functional groups: 2, and theoretical amine equivalent: 77 g/mol) was used in place of polyetheramine.

Comparative Example 5

In Example 1, the same amount of 1,3-bis(3-aminophenoxy)benzene (theoretical molecular weight: 292.1, number of functional groups: 2, and theoretical amine equivalent: 146 g/mol) was used in place of polyetheramine.

Comparative Example 6

In Example 1, the amount of polyetheramine was changed to 0.6 parts by weight.

Comparative Example 7

In Comparative Example 6, in which 0.6 parts by weight of polyetheramine was used, no glass fiber was used, and 100 parts by weight of polyamide 66 was used.

The rubber laminated resin composite obtained in the Examples and Comparative Examples above were measured for adhesive strength by a 90-degree peel test (according to JIS K6256 corresponding to ISO 813) and for the rate of remaining rubber area. Tables 1 and 2 below show the measurement results, together with the weight of the amine compound and the millimole number of amine, per g of the filler-blended polyamide-based resin. The amine millimole number (theoretical value) per g of the filler-blended polyamide-based resin was calculated by the following formula: the weight of amine compound per g of the filler-blended polyamide-based resin (g)×1000/the amine equivalent (g/mol).

TABLE 1

| | (Examples) | | | | | | | | | | |
|---|---|---|---|---|---|---|---|---|---|---|---|
| | 1 | 2 | 3 | 4 | 5 | 6 | 7 | 8 | 9 | 10 | 11 |
| [Amount of amine compound added] | | | | | | | | | | | |
| Amine compound weight $(\times 10^{-5})$ g/ 1 g of filler-blended polyamide-based resin | 4762 | 4762 | 4762 | 4762 | 4762 | 4762 | 9091 | 990 | 744 | 4762 | 990 |
| Amine millimole number $(\times 10^{-4})$/ 1 g of filler-blended polyamide-based resin | 3274 | 12578 | 6184 | 5952 | 4753 | 2381 | 6198 | 675 | 508 | 3247 | 675 |
| [Compounding Example I] | | | | | | | | | | | |
| Adhesive strength | 2.5 | 2.4 | 2.4 | 2.3 | 2.4 | 2.5 | 2.4 | 2.5 | 2.2 | 2.6 | 2.5 |
| Rubber remaining rate | 100 | 100 | 100 | 100 | 100 | 100 | 100 | 100 | 90 | 100 | 100 |
| [Compounding Example II] | | | | | | | | | | | |
| Adhesive strength | 5.5 | 6.0 | 5.7 | 5.8 | 5.9 | 5.4 | 5.2 | 5.3 | 5.2 | 5.5 | 5.9 |
| Rubber remaining rate | 100 | 100 | 100 | 100 | 100 | 100 | 100 | 100 | 80 | 100 | 100 |

TABLE 2

| | (Comparative Examples) | | | | | | |
|---|---|---|---|---|---|---|---|
| | 1 | 2 | 3 | 4 | 5 | 6 | 7 |
| [Amount of amine compound added] | | | | | | | |
| Amine compound weight $(\times 10^{-5})$ g/ 1 g of filler-blended polyamide-based resin | 0 | 4762 | 4762 | 4762 | 4762 | 596 | 596 |
| Amine millimole number $(\times 10^{-4})$/ 1 g of filler-blended polyamide-based resin | 0 | 476 | 286 | 6180 | 3260 | 407 | 407 |
| [Compounding Example I] | | | | | | | |
| Adhesive strength | 0.2 | 1.3 | 1.2 | 1.5 | 2.0 | 0.25 | 1.8 |
| Rubber remaining rate | 0 | 5 | 5 | 0 | 0 | 35 | 50 |
| [Compounding Example II] | | | | | | | |
| Adhesive strength | 0.1 | 1.5 | 1.2 | 1.2 | 1.3 | 0.8 | 1.2 |
| Rubber remaining rate | 0 | 5 | 30 | 0 | 0 | 25 | 40 |

The invention claimed is:

1. A rubber laminated resin composite comprising a polyamide-based resin molded product and rubber that is vulcanization bonded to the polyamide-based resin molded product;
   the polyamide-based resin molded product being molded from a polyamide-based resin that is blended with 15 to 50 wt. % of a filler based on the total amount of the filler and the polyamide-based resin, and which polyamide-based resin further comprises an aliphatic amine compound having an amine equivalent of 950 or less in an amount of 0.065 mmol or more per gram of the polyamide-based resin.

2. The rubber laminated resin composite according to claim 1, wherein the polyamide-based resin is at least one member selected from polyamide 66, polyamide 6, polyamide 610, polyamide 612, polyamide 11, polyamide 12, polyamide 46, polyamide 6T/6I, polyamide 6T/66, polyamide 6T/6, and polyamide 9T.

3. The rubber laminated resin composite according to claim 1, wherein the filler is a glass fiber or a carbon fiber.

4. The rubber laminated resin composite according to claim 1, wherein the aliphatic amine compound has an amine equivalent of 250 or less.

5. The rubber laminated resin composite according to claim 1, wherein the aliphatic amine compound has a boiling point of 120° C. or more.

6. The rubber laminated resin composite according to claim 1, wherein the rubber is fluororubber or acrylic rubber.

7. A method for producing a rubber laminated resin composite, comprising:
   molding a polyamide-based resin that is blended with 15 to 50 wt. % of a filler based on the total amount of the filler and the polyamide-based resin, and which polyamide-based resin further comprises an aliphatic amine compound having an amine equivalent of 950 or less in an amount of 0.065 mmol or more per gram of the polyamide-based resin; and
   vulcanization bonding of rubber to the obtained polyamide-based resin molded product.

8. The rubber laminated resin composite according to claim 4, wherein the aliphatic amine compound has a boiling point of 120° C. or more.

\* \* \* \* \*